United States Patent
Rother et al.

[15] 3,701,881
[45] Oct. 31, 1972

[54] METHOD AND APPARATUS FOR WELDING METAL SHEETS

[72] Inventors: Wolfgang Rother, Meiningen; Eberhard Mordig, Potsdam; Erwin Wenzel; Dieter Gronert, both of Elsterwerda; Karl Sand, Finsterwalde; Joachim Kasbohm, Berlin; Heinz Henicke, Berlin-Altglienicke; Helmut Landmann, Werder-Havel; Winfried Stöcker, Babelsberg, all of Germany

[73] Assignee: Veb Kombinat Luft-Und Kaltetechnik, Dresden, Germany

[22] Filed: March 8, 1971

[21] Appl. No.: 122,246

Related U.S. Application Data

[63] Continuation-in-part of Ser. No. 729,700, May 16, 1968, abandoned.

[52] U.S. Cl. ............... 219/123, 219/121 P, 219/137
[51] Int. Cl. ................................................. B23k 9/08
[58] Field of Search...29/75, 121 P, 121 R, 123, 156, 29/161, 162, 137

[56] References Cited

UNITED STATES PATENTS

| | | |
|---|---|---|
| 2,756,311 | 7/1956 | Perssen et al............219/74 X |
| 1,243,589 | 10/1917 | Coffin......................219/123 |
| 2,254,314 | 9/1941 | Reed.....................219/161 X |
| 2,856,510 | 10/1958 | Jones et al...................219/74 |

*Primary Examiner*—C. L. Albritton
*Attorney*—Nolte and Nolte

[57] ABSTRACT

In a method of welding relatively thin metal sheets composed at least in part of steel, the steps of electromagnetically holding the sheets which are to be welded while directing to a location on a line where the welding seam is to be situated a welding arc having a hot electrically conductive core and a relatively cold electrically non-conductive sheath, providing relative motion between the sheets and the arc along a line corresponding to the seam, surrounding the arc with a wall of protective gas preventing access of the outer atmosphere to the arc, and providing a magnetic field which deflects the core away from the sheath so that the core impinges upon the line at a location on said line spaced from the location where the sheath impinges upon the line, the core and the sheath both impinging upon the sheets within the wall of protective gas, while providing for the electromagnetic holding a magnetic field which does not interfere with said deflection of the welding arc.

11 Claims, 4 Drawing Figures

PATENTED OCT 31 1972 3,701,881

METHOD AND APPARATUS FOR WELDING METAL SHEETS

This is a continuation-in-part of application Ser. No. 729,700, filed May 16, 1968 and now abandoned.

The invention relates to a method and apparatus for welding metal sheets, particularly relatively thin sheets which may have a thickness ranging from 0.7 to approximately 3 mm. and which preferably are constituted of steel, although alloy sheets, which are only partly composed of steel, can also be welded according to the invention.

There are known methods for butt welding metal sheets which are primarily highly alloyed, by making use of a plasma arc. In this way the high concentration of energy of this arc achieves a melting of the edges, which are to be welded to each other, throughout the entire thickness of the work material. The liquifield work material is laterally compressed, and after passing the welding burner the molten work material runs together to form the weld. This is brought about by the surface tension of the molten material. However, openings resulting from the movement of the work material portions apart from each other sometimes occur; this is the so-called "keyhole effect."

There are also known devices which bring about butt welding of relatively thin alloyed sheets of metal. In these known constructions the current is delivered to the work by way of electrode rollers which are guided along the sheets which are to be welded to each other, above and below the latter. In this way a localized heated area is achieved. In order to heat both of the sheets and thus guarantee a faultless weld, foils are placed at the location where the edges which are to be welded butt against each other, these foils serving as a current bridge for distribution of the current along the edges of the metal sheets. With this arrangement it is essential that the foils be centrally arranged with respect to the seam, so that suitable guiding devices are required for this purpose. The required pressure of the edges which are to be welded against each other by this method is brought about as a result of the expansion achieved from the heating of the work, inasmuch as the sheets are preferably electromagnetically held, so that the expansion can only take place in a direction which presses the edges which are to be welded toward each other. Thus, in this case, the static pressure exerted by the electrode rollers is applied in a vertical direction.

A disadvantage of these known methods resides in the fact that they can be used for highly alloyed sheets only when the thickness of the sheets is not less than 3 mm.

In the above-described known structures, because of the high pressure with which the electrode rollers must engage the work, there is rapid wear of these rollers so that a corresponding inventory of replacement parts must be maintained. The speed with which the welding is carried out causes influencing of the metal sheets at their edges by heat which produces distortion of the sheets, so that an additional straightening thereof is required. Even with relatively small deviations in the position of the foils away from their central position there are unavoidable detractions in the quality of the welded seam. One of the more important disadvantages resides in the required heat treatment of the seam subsequent to the formation thereof in order to prevent formation of cracks. Moreover, a dense welding cannot be provided because the formation of pores takes place. If alloyed sheets are to be welded, it is essential to use foils of a correspondingly suitable composition. As a result, it is necessary to maintain on hand a large supply of different types of foils.

It is accordingly a primary object of the present invention to provide a method and apparatus for carrying out welding of the above type while avoiding the above drawbacks.

Thus, it is an object of the present invention to provide a method and apparatus which makes it possible to weld to each other non-alloyed or alloyed sheets of metal without requiring the use of foils.

Also, it is an object of the present invention to provide a method and apparatus for welding sheets in a manner which will eliminate the requirement for subsequent heat treatment thereof.

Also, it is an object of the invention to provide a method and apparatus which will provide a welded seam in which pores are not formed, so that it is possible with the method and apparatus of the invention to provide a welded seam capable of having a density which is sufficiently great to provide for reliable welds in structures such as containers for gases or liquids.

Furthermore, it is an object of the invention to provide a method and apparatus which makes it possible to weld metal sheets having a thickness which is substantially less than 3 mm. while maintaining all of the above advantages of the invention.

It is particularly an object of the invention to provide a method and apparatus capable of welding together relatively thin sheets composed at least in part of steel while making use of a plasma welding arc capable of providing the desired welded seam at a much greater welding speed than has heretofore been possible with comparable methods and apparatus while eliminating any requirements for subsequent operations to be performed on the weld.

In accordance with the invention, there are provided a method and apparatus in which a welding arc, preferably a plasma arc, having a hot electrically conductive core and a relatively cool electrically non-conductive sheath, is directed along the line at which the welding seam is to be located, relative motion is provided between the arc and the sheets to move the arc along the line, the arc is surrounded with a wall of protective gas, a magnetic field is provided to deflect the core to a location on the line spaced in the direction of said motion from the point of impingement of the sheath on the line, the core and sheath however both remaining within the wall of protective gas, and a magnetic field is provided to hold the sheets without interfering with the aforementioned deflection.

The invention is illustrated by way of example in the accompanying drawings which form part of this application and in which.

Figure 1:
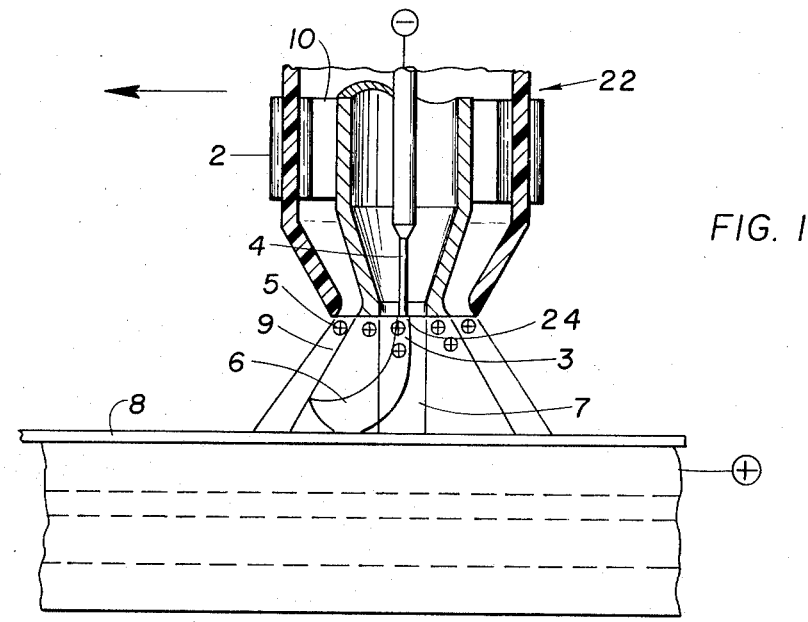
FIG. 1 is a schematic longitudinal sectional elevation of an apparatus of the invention for carrying out the method of the invention, the section of FIG. 1 being taken in a longitudinal plane which contains the center of the welding arc, the welding seam, and the wall of protective gas which surrounds the arc.
Figure 2:
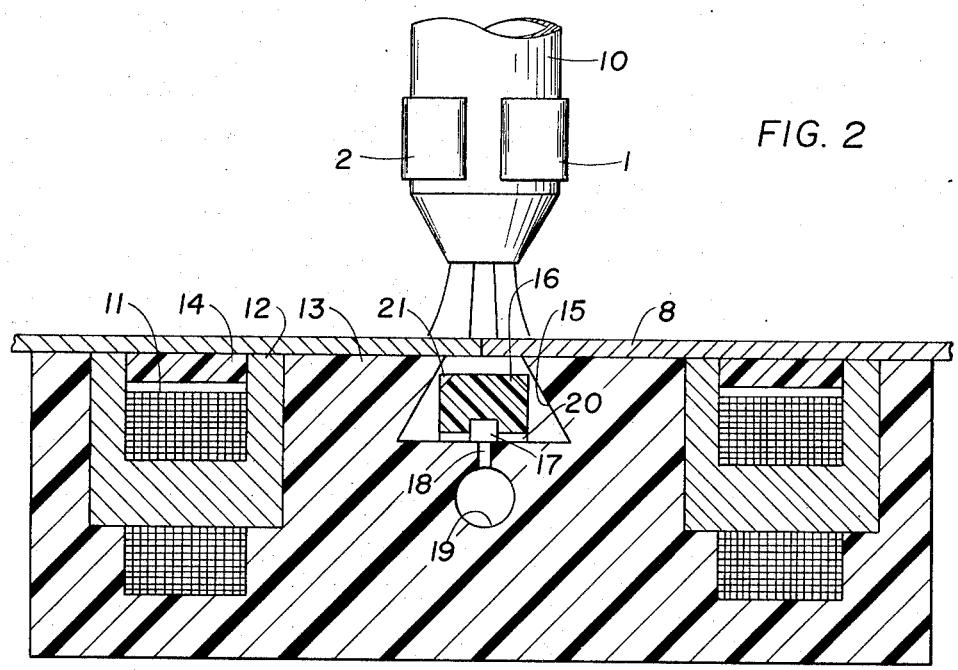
FIG. 2 is a transverse section of the apparatus of FIG. 1, FIG. 2 showing in particular the structure for holding the work and for applying a stream of protective gas against the base or lower portion of the welded seam.
Figure 3:
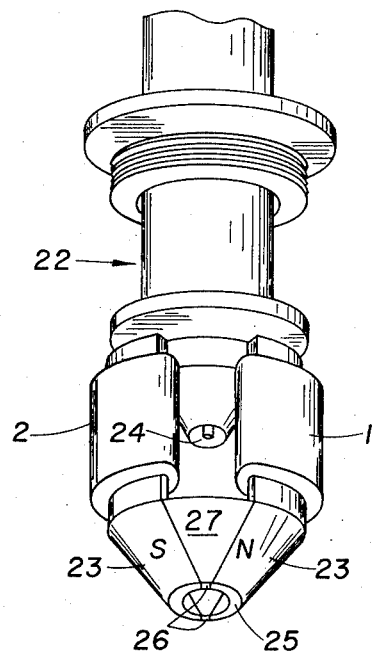
FIG. 3 is an exploded perspective illustration of the burner.

Referring now to the drawings, and in particular to FIGS. 1 and 3, it will be seen that burner means 22 of the apparatus of the invention includes magnets 1, 2 which creates a magnetic field 5, bringing about a deflection of a welding arc 3. The welding arc 3 issues from the tip of a nozzle 4 and after leaving the latter enters into a magnetic field 5 which extends perpendicularly with respect to the welding arc 3 and the direction in which the melting takes place to provide the welded seam. The current conducting core 6 of the arc is deflected in the direction in which the welding operations advance, so as to achieve a superior and more uniform seam structure. The electrically non-conductive, relatively cold outer portion or sheath 7 of the arc, which surrounds the core 6 thereof, remains uninfluenced by the magnetic field 5. Thus, the outer surrounding portion 7 of the arc maintains its original direction while the core 6 is deflected. The intensity of the magnetic field 5 is sufficiently great so that the core 6 of the arc is deflected to such an extent that it becomes situated at a distance sufficiently great from the area where the sheath 7 engages the work 8, and thus the core 6 melts the work. The wall of protective gas 9 which shields the bath of molten metal is blown out of the annular nozzle 10 having a configuration providing for the surrounding wall of protective gas 9, which prevents contact of the outer atmosphere with the welding arc, a downwardly flaring configuration of the wall screening off the bath of molten metal from the outer atmosphere and covering the arc 3 as well as the molten bath of metal.

The holding of the work material 8 is brought about by electromagnetic holding plates forming an electromagnetic holding means and including elongated electromagnetic coils 11 and iron cores 12 which are embedded within a non-magnetic material 13. The magnetic coils 11 are preferably vertically arranged and extend longitudinally in the direction of movement of the burner during the welding operations so that the coils 11 and the cores 12 surrounded thereby extend perpendicularly with respect to the arc 3. The parts of the coils which are directed toward the upper side of the holding plates are covered by plates 14 of a non-magnetic material. As a result of this arrangement, the deflection of the core 6 of the welding arc is not interfered with by the magnetic field of components 11, 12, 14.

In order to prevent access of oxygen to the molten metal at the underside thereof where the base of the welded seam is located, the work supporting structure is provided beneath the weld with a longitudinally extending groove 15 of dovetail cross section which has situated centrally thereof an elongated bar 16 which is preferably of rectangular or square cross section. The bar 16 is formed longitudinally of its lower surface with an elongated groove 17 which, through a longitudinally extending slot 18 in the body 13, communicates with a bore or passage 19. The bar 16 is also formed at its lower surface with transverse grooves 20 which are distributed longitudinally along the bar 16 and intersect and extend across the longitudinal groove 17, while along the upper opposed edges of the bar 16 inclined grooves 21 are provided. The bar 16 is made of an electrically non-conductive heat resistant material. The protective gas flows through the passage 19 from any suitable source, through the slot 18 and then into the groove 17 and out through the transverse grooves 20 and along the inclined notches 21 to the underside of the material so as to directly engage and flow along the base portion of the welded seam.

A suitable protective gas is a mixture of a polyatomic gas, preferably hydrogen, with an inert gas, preferably argon. The ratio of the components of the mixture is determined by the thickness of the work.

The magnets 1, 2 of burner 22 which produces the welding arc are arranged in such a way that the pole shoes 23 terminate in bottom end edges 25 in the form of arcs of a circle situated at the elevation of nozzle outlet 24, and in the common plane of the nozzle outlet 24 and the bottom arcuate end edges 25 of the pole shoes 23 the latter are situated in spaced relation to each other by relatively small distances 26. Between the pole shoes 23 non-magnetic material 27 is preferably located. FIG. 3 shows the burner means 22 in an exploded illustration. The nozzle outlet 24 is situated, in the operating condition of the structure, at the elevation of the end edges 25 of the pole shoes 23.

Figure 4:
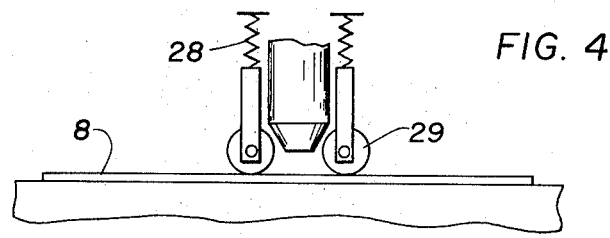
FIG. 4 is a schematic side elevation of the structure which presses against the work.

In order to achieve a faultless location of the work in the immediate region of the welding, which is a requirement for a faultless welding seam, rollers 29 (FIG. 4) are provided for fixing the material which is to be welded, springs 28 forming a spring means which urges the rollers 29 against the work. In this way shifting of the work edges, which are to be welded to each other, is reliably avoided. The rollers are situated before and behind the burner means and the trailing roller prevents any rupture in the molten metal situated directly behind the welding arc which molten metal has not yet solidified, such ruptures being brought about as a result of heat stresses and the tendency of the work to deform. As an alternative to rollers, there may be employed slidable runners or other pressure-exerting work holding means, if desired. Also, the pressure of the work holding means against the work may be adjusted, for example through adjusting screws.

With the above-described method and apparatus of the invention a number of advantages are achieved as compared to conventional methods and apparatus.

Thus, the energy required for the welding operation of the invention is substantially lower than required, for example, where the butt welding operations are carried out with the use of foils, so that highly favorable costs are achieved with the method and apparatus of the invention. The required high pressure of the roller electrodes provides in the conventional methods and apparatus a high rate of wear thereon. This latter disadvantage is eliminated with the method and apparatus of the invention and inasmuch as the transmission of the energy required to heat the sheet material takes place without the use of any electrodes which are required to slide or roll on the work. The speed with which the welding operations are carried out is much higher with the method and apparatus of the invention than with conventional methods and apparatus, in the range of sheet thickness included within the possible range of use of a welding machine for thin sheets, such as, for example, a range of sheet thickness of between 0.7 and 3 mm.

A further important advantage resides in the possibility of carrying out welding of alloyed steel sheets without additional welding equipment such as, for example, suitable foils which must correspond to the welded material in their composition. The welding seam which is achieved with the invention is free of any pores, so that the method and apparatus of the invention can be used in those cases where the welded seam is required to have a high density. The extent to which the welded seam achieved with the invention projects from the work is so small, as a result of the smoothing action of the welding arc, that subsequent finishing operations are not required. The heated zone is substantially smaller than in the case of conventional butt welding operations carried out with foils, for example, so that in this way there is much less heat distortion so that the otherwise considerable shrinkage, both longitudinally and transversely with respect to the work, is reduced to a minimum.

The welding gap between the sheets which are to be welded to each other can have relatively larger tolerances than was heretofore possible without in any way detracting from the quality of the welded seam. As contrasted with known welding methods, where with a change in the thickness of the work it was also required to change the corresponding parameters, these requirements are not present with the method and apparatus of the invention. Without any adjustment of the welding apparatus it is possible to weld metal sheets of different thicknesses within the range of operating thicknesses which can be handled by the method and apparatus of the invention. The factors which are here considered are the intensity of the current, the supply of gas, the distance of the burner, the distance between the electrodes, the electrode diameters, and the nozzle diameters. It is only required to adjust the speed with which the welding progresses in dependence upon the thickness of the sheet material which is welded. This simple operating requirement saves time and avoids to a very large extent adjusting errors as well as the lengthy tests required in order to achieve the required parameters.

What is claimed is:

1. In a method of welding relatively thin metal sheets composed at least in part of steel, the steps of electromagnetically holding the sheets which are to be welded while directing to a location on a line where the welding seam is to be situated a plasma welding arc having a hot electrically conductive core and a relatively cold electrically non-conductive sheath, providing relative motion between the sheets and the arc along a line corresponding to the seam, surrounding the arc with a wall of protective gas preventing access of the outer atmosphere to the arc, and providing a magnetic field which deflects the core away from the sheath in one direction so that the core impinges upon the line at a location on said line spaced in the direction of said relative motion from the location where the sheath impinges upon the line, the core and the sheath both impinging upon the sheets within the wall of protective gas, while providing for the electromagnetic holding a magnetic field which does not interfere with said deflection of the welding arc.

2. The method of claim 1 and wherein the sheets which are welded have a thickness of approximately 0.7 to 3 millimeters.

3. The method of claim 1, including the step of directing along the base of the welding seam a flow of polyatomic gas composed of a mixture of hydrogen and an inert gas in a ratio in accordance with the thickness of the metal sheets which are welded.

4. The method of claim 3 and wherein the inert gas is argon.

5. In an apparatus for welding relatively thin metal sheets composed at least in part of steel, burner means for generating a plasma welding arc having a hot electrically conductive core and a relatively cold electrically non-conductive sheath and for directing the arc to a location on a line where the welding seam is to be located, said burner means including a nozzle assembly from which the arc issues together with a surrounding wall of protective gas preventing access of the outer atmosphere to the arc, means for providing relative motion between the sheets and the arc along the line, said burner means including a magnet assembly for providing a magnetic field which deflects said core away from said sheath in one direction so that the core impinges upon the sheets at a location spaced in the direction of said relative motion from the location at which the sheath impinges upon the sheets and the core and the sheath both impinge upon the sheets within the wall of protective gas, and electromagnetic work-holding means for holding the sheets in a position to be welded while providing a magnetic field which does not interfere with said deflection of the welding arc.

6. The combination of claim 5 and wherein said burner means includes at said magnet assembly thereof pole shoes terminating at the elevation of an outlet opening of the nozzle assembly in arcs of a common circle with said arcuate terminations of said pole shoes being slightly spaced from each other, and bodies of non-magnetic material being situated between said pole shoes, said arcuate terminations of said pole shoes being situated in a plane which contains the outlet opening of said nozzle assembly.

7. The combination of claim 5 and wherein said burner means includes at said nozzle assembly an inner tip from which the welding arc issues and an outer annular nozzle chamber surrounding said tip and directing around the arc a wall of protective gas, said annular nozzle chamber having a configuration which provides an outward flaring of the wall of protective gas to achieve therefrom a protective bell-shaped configuration situated over the welding arc and the molten bath of metal derived from the heat of the welding arc.

8. The combination of claim 5 and wherein said electromagnetic work-holding means includes elongated iron cores and coils surrounding the latter, a non-magnetic material in which said cores and coils are embedded, said elongated coils and cores extending perpendicularly with respect to the welding arc in the direction in which the arc is advanced during the working operations, and a covering plate of non-magnetic material covering the part of the coil which is directed toward a side of the work-holding means which is to contact the sheets.

9. The combination of claim 5 further comprising supply means for supplying protective gas to the base of the welding seam, said supply means including an elongated body situated beneath the welding seam and formed with an elongated groove of dovetail cross section, an elongated bar of rectangular cross section extending along said groove, said bar having an underside facing directly away from the sheets and outer sides perpendicular to the underside, said body being formed with a bore and said bar being formed at its underside with a groove communicating with said bore and extending longitudinally of said body, said bar being formed at its underside with transverse grooves extending to the outer sides of said bar at spaced locations along said bar and extending across said longitudinal groove and said bar having a pair of opposed upper edges formed with inclined grooves, said bar being made of a heat resistant, electrically non-conductive material.

10. The combination of claim 5 and wherein an upper holding means engages an upper side of the work while said electromagnetic holding means engages a lower side of the work, said upper holding means engaging the work for movement therealong in the immediate vicinity of the welding zone and remaining in operative pressing engagement with the work immediately before and behind the burner means, and spring means urging said upper holding means into engagement with the work.

11. The combination of claim 9 and wherein said upper holding means includes rollers which engage and roll along the work at an upper surface thereof.

* * * * *